Dec. 9, 1952     S. D. RUSSELL     2,620,611
METHOD OF CURING HAY

Filed May 5, 1947     2 SHEETS—SHEET 1

INVENTOR.
Stanley D. Russell
BY
Attorney

Dec. 9, 1952    S. D. RUSSELL    2,620,611
METHOD OF CURING HAY
Filed May 5, 1947    2 SHEETS—SHEET 2
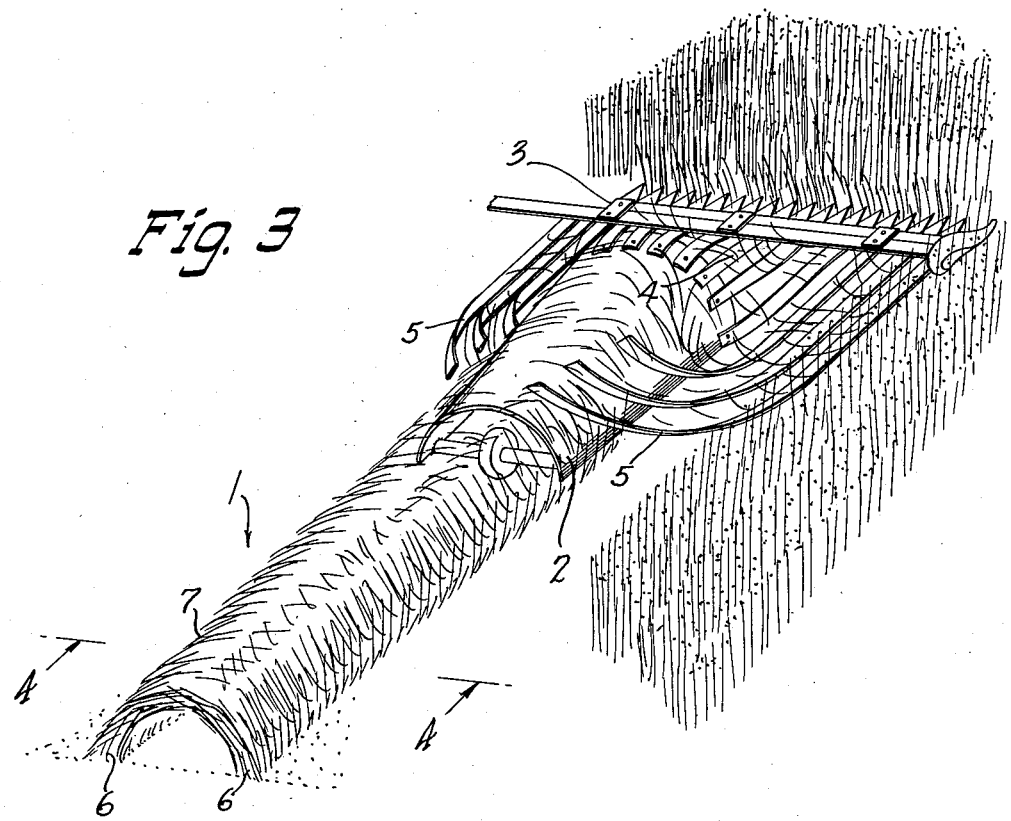
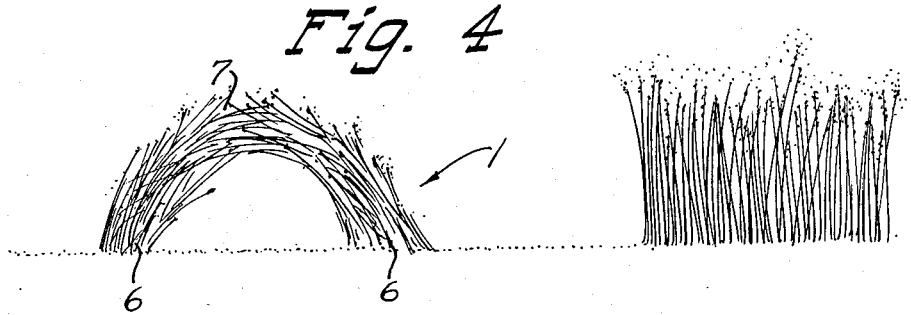
INVENTOR.
Stanley D. Russell
BY
Attorney Patented Dec. 9, 1952

2,620,611

UNITED STATES PATENT OFFICE 2,620,611

METHOD OF CURING HAY

Stanley D. Russell, Racine, Wis., assignor to J. I. Case Company, Racine, Wis., a company of Wisconsin Application May 5, 1947, Serial No. 746,042

7 Claims. (Cl. 56—1)

This invention relates to the curing of hay in the field without the use of artificial drying means, after mowing and prior to baling or loading for transportation to the barn.

One of the principal objects of the invention is to improve the quality and uniformity of cure of the hay.

Another object of the invention is to reduce the labor required in handling the hay for curing it.

Another object is to shorten the time required for curing hay without using artificial drying methods.

Another object is to reduce the danger of sun discoloration of the hay and of molding from dampness and the like.

Another object is to reduce the loss of leaves by reason of their becoming over-dried and falling during handling.

Another object is to keep the hay cleaner and prevent contamination of the hay with dirt, stones and refuse.

Another object is to eliminate the necessity of initial curing of the hay in the swath, and its attendant bleaching, loss of leaves and tendency to effect contamination of the hay with dirt and stones.

Another object is to eliminate the necessity of turning the swath or windrow in order to obtain adequate drying of all parts of the hay, and its attendant labor and cost.

Another object is to reduce the danger of spoiling of the hay by rain, both by reason of the shorter time required by the process of the invention and by reason of the nature of the process which results in less tendency of the hay to lie in puddles and to become soaked with dirty water.

Another object is to reduce the tendency of molding of the hay from dew and the like.

Another object is to reduce the sunshine necessary to cure the hay and thereby avoid undesirable bleaching and loss of food value.

Another object is to reduce the tendency to injure a subsequent hay crop by excessive trampling of the field or too long a time of blanketing of the same by the crop being cured.

According to the invention the hay is gathered into arched windrows in which free circulation of air may occur for rapid drying purposes. The major part of the hay is held off from the ground and spaced above the same in the arched roof portion of the windrow so that less hay contacts the ground and there is less tendency to mold from dampness.

The arched windrows may be formed at any time after the hay is cut. Preferably the windrows are formed immediately following the mower and without waiting for initial drying of the cut swath.

The process is illustrated in the accompanying drawing in which.

Figure 1:
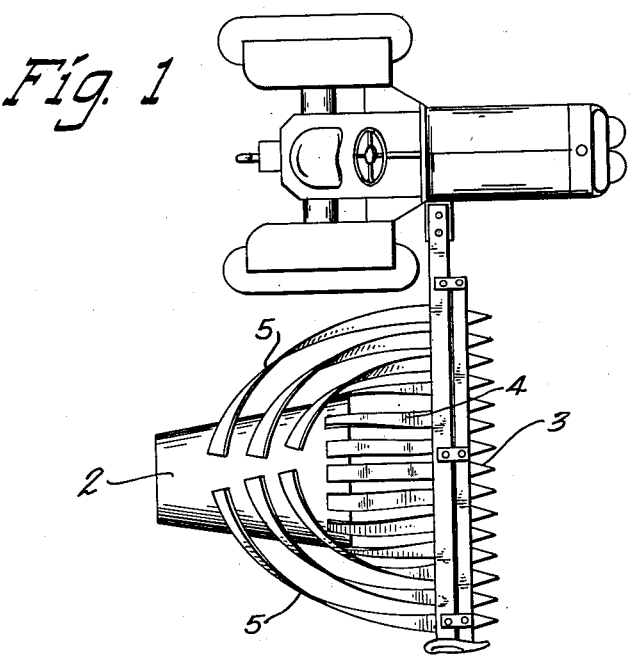
Figure 1 is a top plan view of a tractor drawn device suitable for carrying out the processes of the invention.
Figure 2:
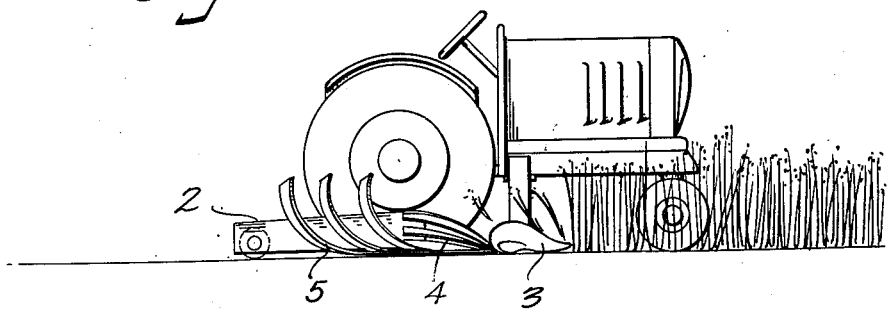
Fig. 2 is a side elevational view of the same device.

Fig. 3 constitutes a perspective view intended to illustrate the carrying out of the invention; and Fig. 4 is a transverse vertical section of a windrow formed by the process.

In forming the arched windrow 1 the hay from one or more swaths is gathered laterally inwardly and lifted above an arch-shaped form 2 which is moved longitudinally along the ground beneath the hay, and the hay is dropped onto the form and remains in an arch-shaped windrow when the form is drawn out from under the hay.

Where the process is carried out immediately following the mower, the form 2 may be either carried by the mower or pulled behind the sickle 3 by the bars 4 secured to the sickle and to the form, and the hay may be lifted onto the form directly from the sickle by the bars 4 and by additional bars 5 which extend rearward from behind the sickle on opposite sides of the form 2 and curve upwardly and inwardly over the form. In this instance the form is preferably centrally located relative to the sickle and the hay cut at each end of the sickle is gathered inwardly by the bars 5 to provide a relatively narrow and high arched windrow.

Where the process is carried out some time after cutting of the hay and while the latter lies in swaths, the hay of one or more swaths is progressively gathered inwardly and lifted above and dropped onto a moving form 2.

The size of the windrow 1 to be formed and the number of swaths necessary for its formation are matters dependent upon the crop stand and weather conditions. Where the stand is heavy only a single swath is necessary to form an adequate arched windrow. In windy, dry climatic conditions a larger heavier windrow should be employed than in opposite climates.

The type of hay is also a factor, legume types such as alfalfa and clover being most suitable to the forming of stable arched windrows.

In gathering the hay inwardly above the form 2 the hay is preferably thoroughly intertwined so that the mass of hay remains arched and does not flatten out after the form is withdrawn from beneath.

Any suitable apparatus may be employed for raising and gathering the hay. The form 2 may be supported on wheels disposed inside the same to prevent scraping and wear of the same on the ground. The length of the form should be sufficient to provide that the hay, after being dropped on the form, comes to rest in the desired arched windrow shape before the form is fully withdrawn. The transverse shape of the form should be of a nature to provide the desired arch for the windrow when the form is withdrawn.

Where the windrow is to be formed immediately following the mower the form is either carried by or is drawn directly behind the mower sickle and the hay from the sickle is gathered inwardly to conform to the size of the form. In this instance the form should be substantially narrower than the length of the sickle.

The windrow 1 being in the form of an arch, has its outer marginal edges 6 resting upon the ground and its raised central crown portion 7 spaced above the ground, which facilitates passage of air through the hay and greatly hastens the drying of the hay.

Turning of the windrow is unnecessary since the hay dries on the inside of the windrow substantially as fast as on the outside.

The relatively small part of the hay in contact with the ground on the opposite sides of the arched windrow readily dries out by reason of circulation of air through and on all sides of the windrow, thereby reducing the tendency to mold from dampness.

The hay is more uniformly cured than in former processes, and without undue handling.

The invention may be carried out in various ways within the scope of the claims.

I claim:

1. The process of curing hay comprising progressively lifting at least one swath of hay above the ground and dropping the same upon a fixed form, and progressively withdrawing the form from beneath the hay to leave an arched windrow of hay through which air may circulate freely for drying of the hay.

2. The process of curing hay comprising progressively lifting at least one swath of hay above the ground and gathering the same inwardly to reduce the spread thereof, dropping the gathered hay upon a fixed form, and progressively withdrawing the form longitudinally from beneath the hay to leave an arched windrow of hay through which air may circulate freely for drying of the hay.

3. The process of curing hay comprising cutting a swath of hay and immediately raising the cut hay from the sickle onto a narrow fixed form directly behind the sickle with the side edges of the swath brought inwardly along the sides of the form, and advancing the form with the sickle to withdraw the form from the hay lying thereon and leave an arched windrow of intermeshed hay generally raised from the ground and through which air may circulate for curing the hay.

4. In the curing of hay in the field, the step comprising gathering windrows of the crop into a thin intermeshed mass of arched transverse section having outer margins supporting the same on the ground with substantial stability against wind and a minimum of contact with the ground.

5. In the curing of hay in the field, the step comprising gathering windrows of the crop into a thin intermeshed mass of arched transverse section having outer margins, and placing the same on the ground with only the outer margins in contact therewith to provide substantial stability against wind and reduce deterioration of the hay by ground moisture.

6. In haying, the process of mowing the hay, intermeshing the individual stalks of cut hay and forming the intermeshed mass of stalks into an arched shape windrow having outer margins, and progressively placing the windrow on the ground with the outer margins of the windrow supporting the same for substantial stability against wind.

7. In haying, the process of mowing the hay, gathering the cut hay swath into a flat ribbon-like mass, then bending the outer edges of the mass upwardly and inwardly over the central portion thereof and raising the central portion to form an arch, and depositing the arch on the ground progressively in the form of a windrow of arched transverse section having its outer margins supported on the ground and providing substantial stability against wind.

STANLEY D. RUSSELL.

REFERENCES CITED

The following references are of record in the file of this patent:

UNITED STATES PATENTS

| Number | Name | Date |
|---|---|---|
| 38,626 | Embree | May 19, 1863 |
| 79,871 | Sprague | July 14, 1868 |
| 418,141 | Schaeffer | Dec. 24, 1889 |
| 765,218 | Whitely | July 19, 1904 |
| 1,542,235 | Graham | June 16, 1925 |
| 1,906,498 | Templeton | May 2, 1933 |

FOREIGN PATENTS

| Number | Country | Date |
|---|---|---|
| 414,094 | Germany | of 1925 |